Figure 2B:
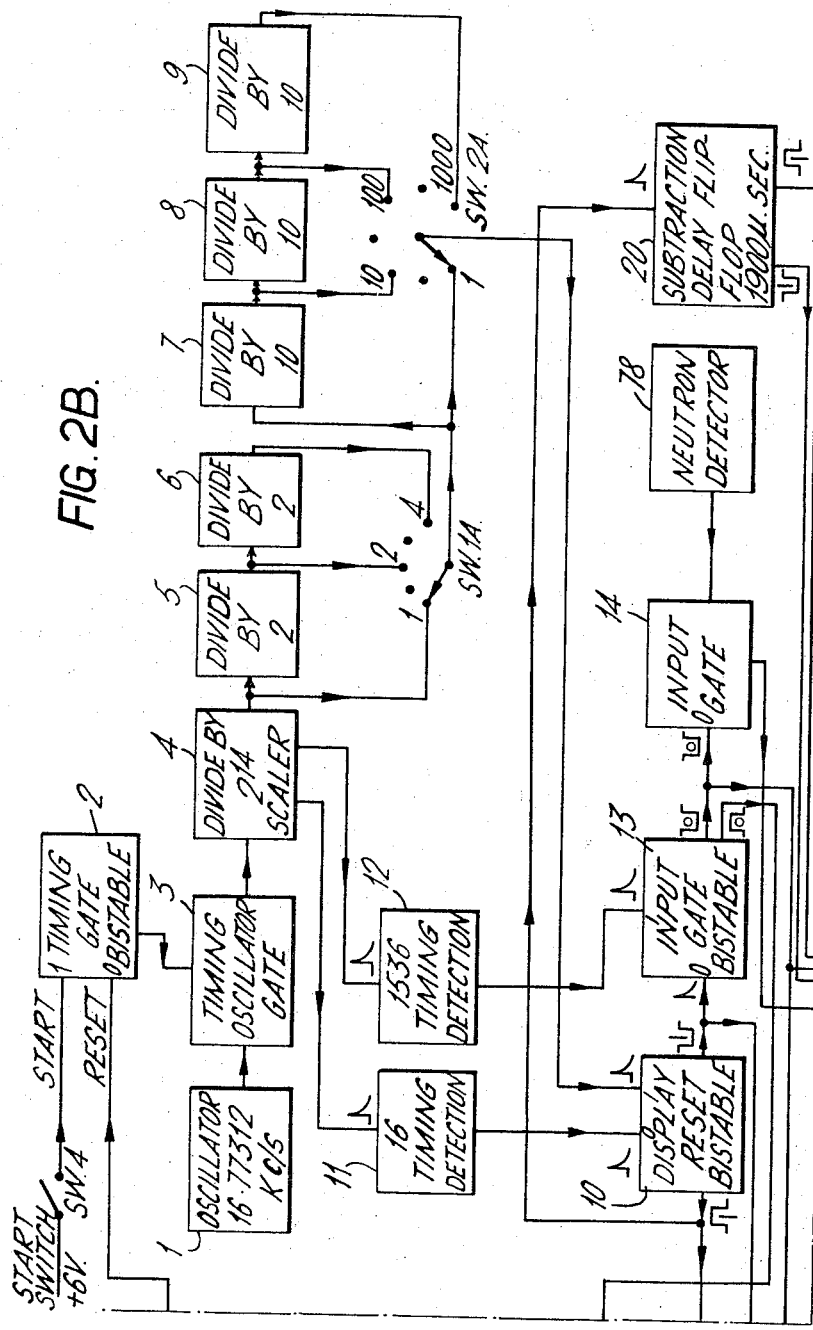
Figure 2C:
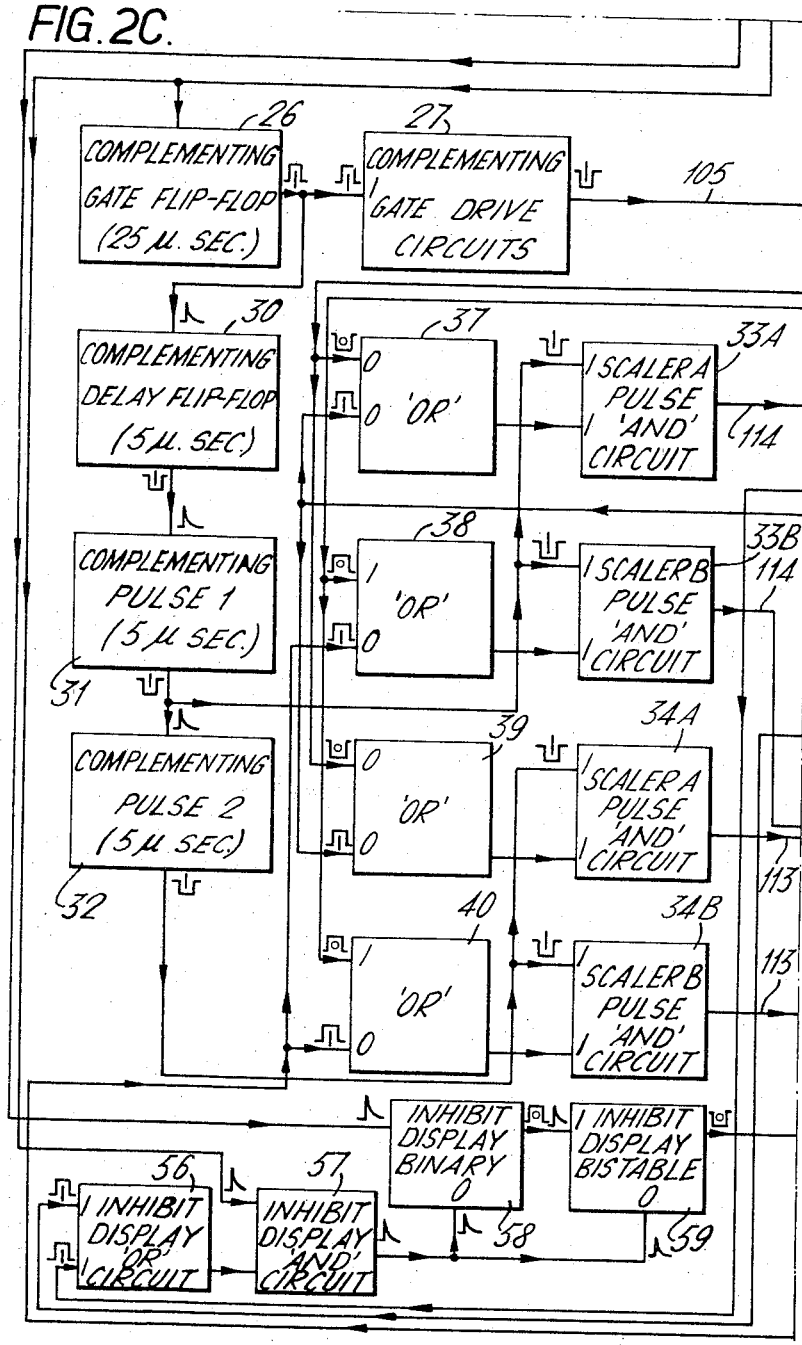
Figure 2E:
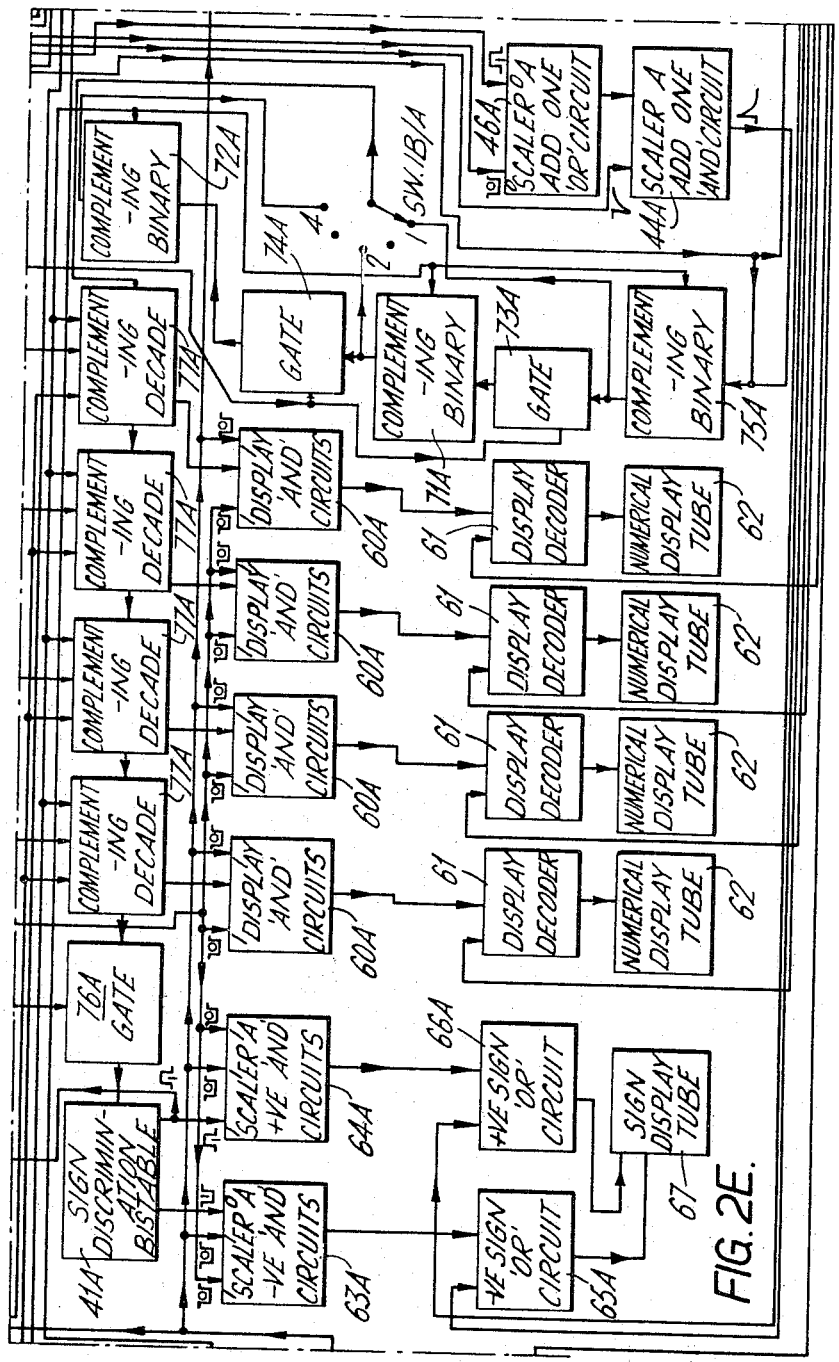
Figure 2F:
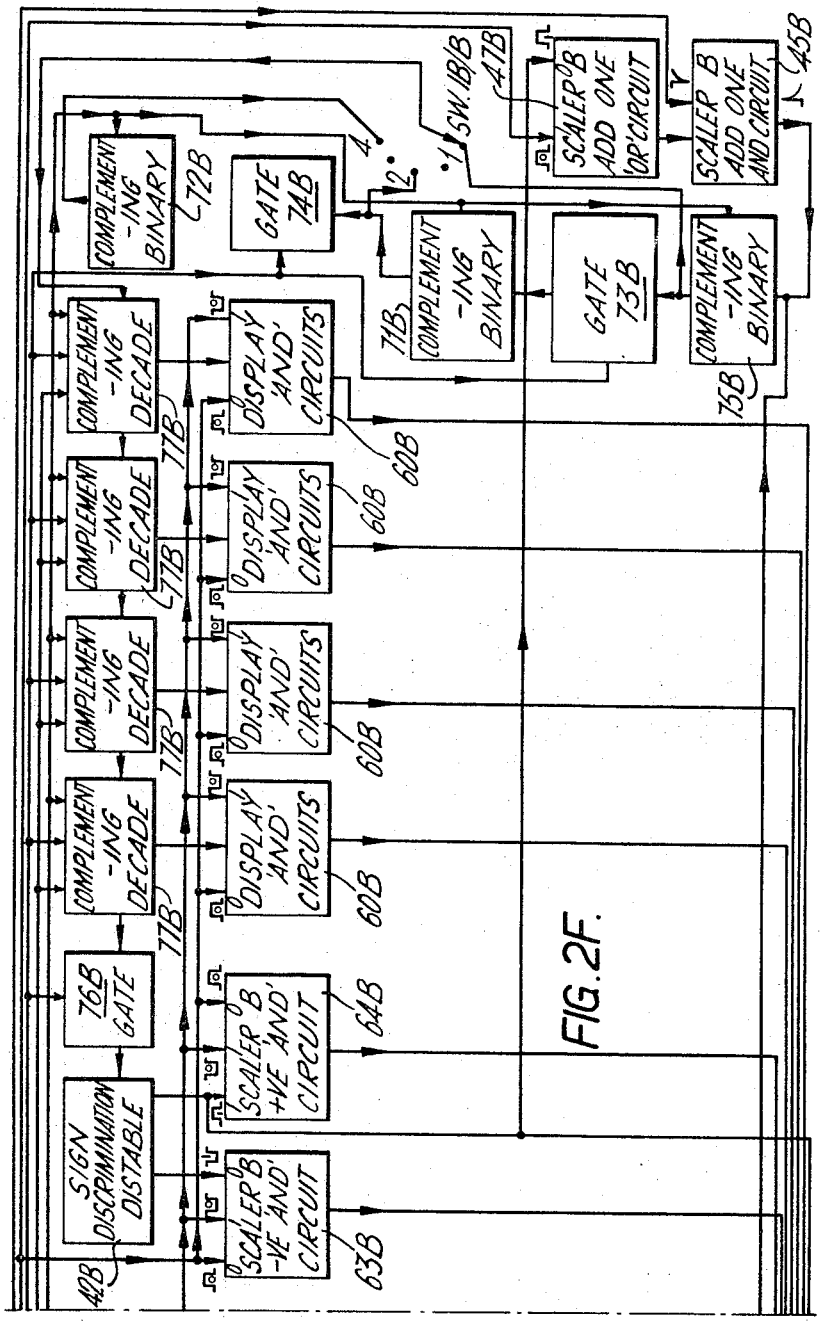

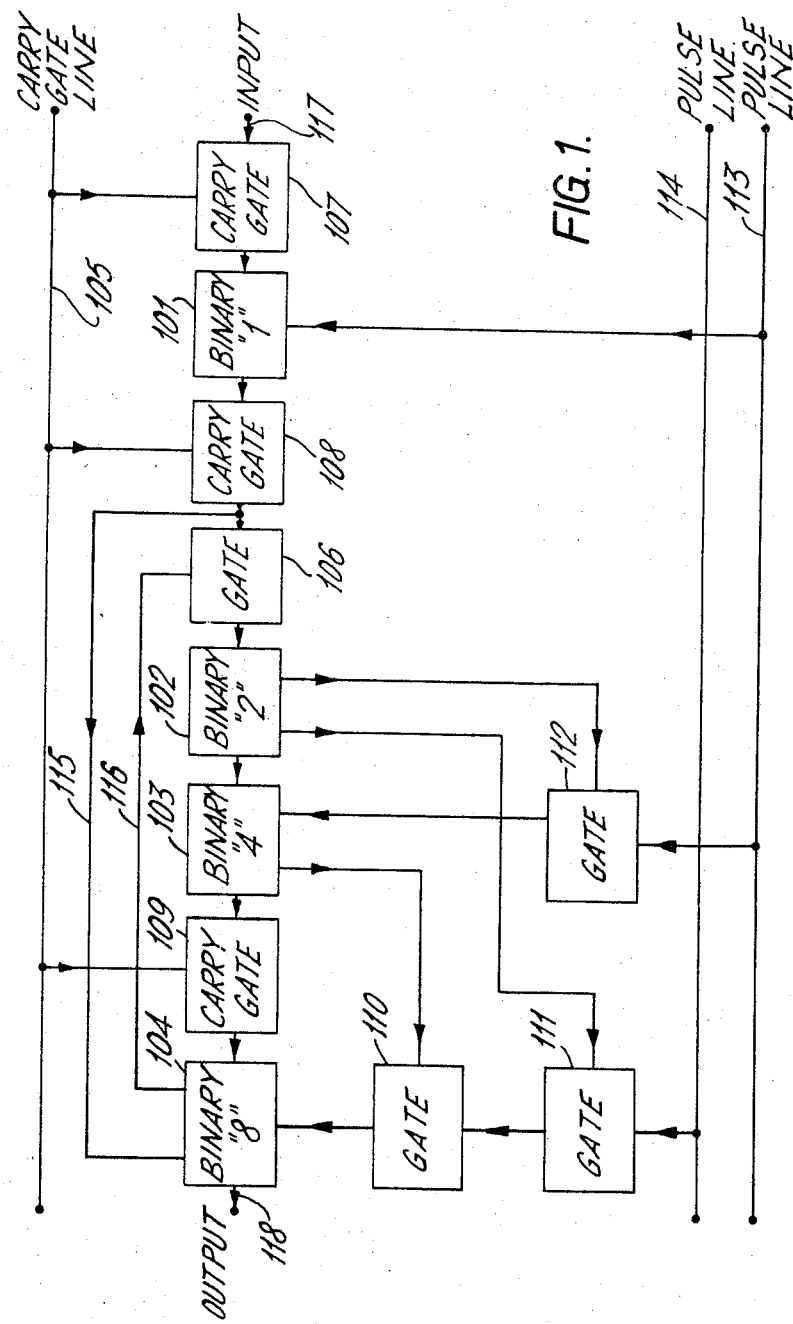

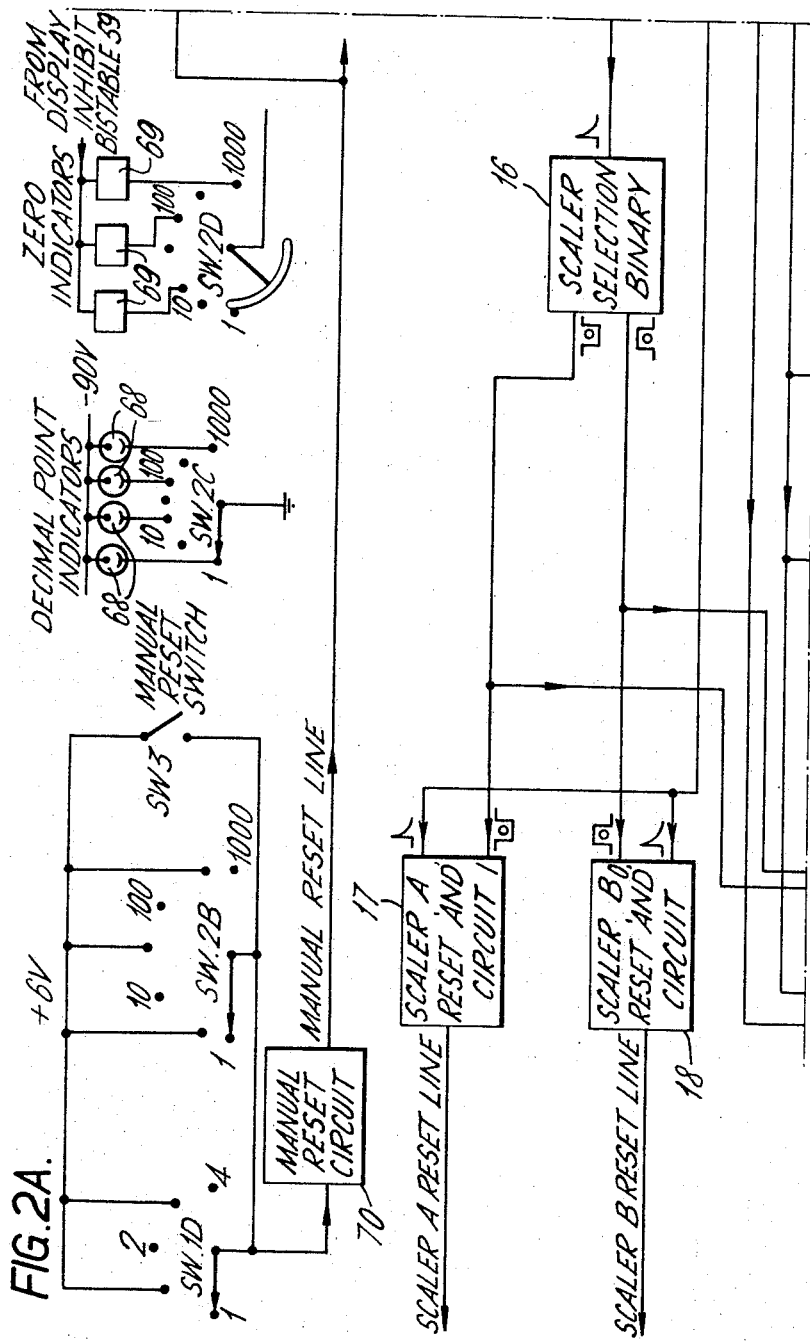

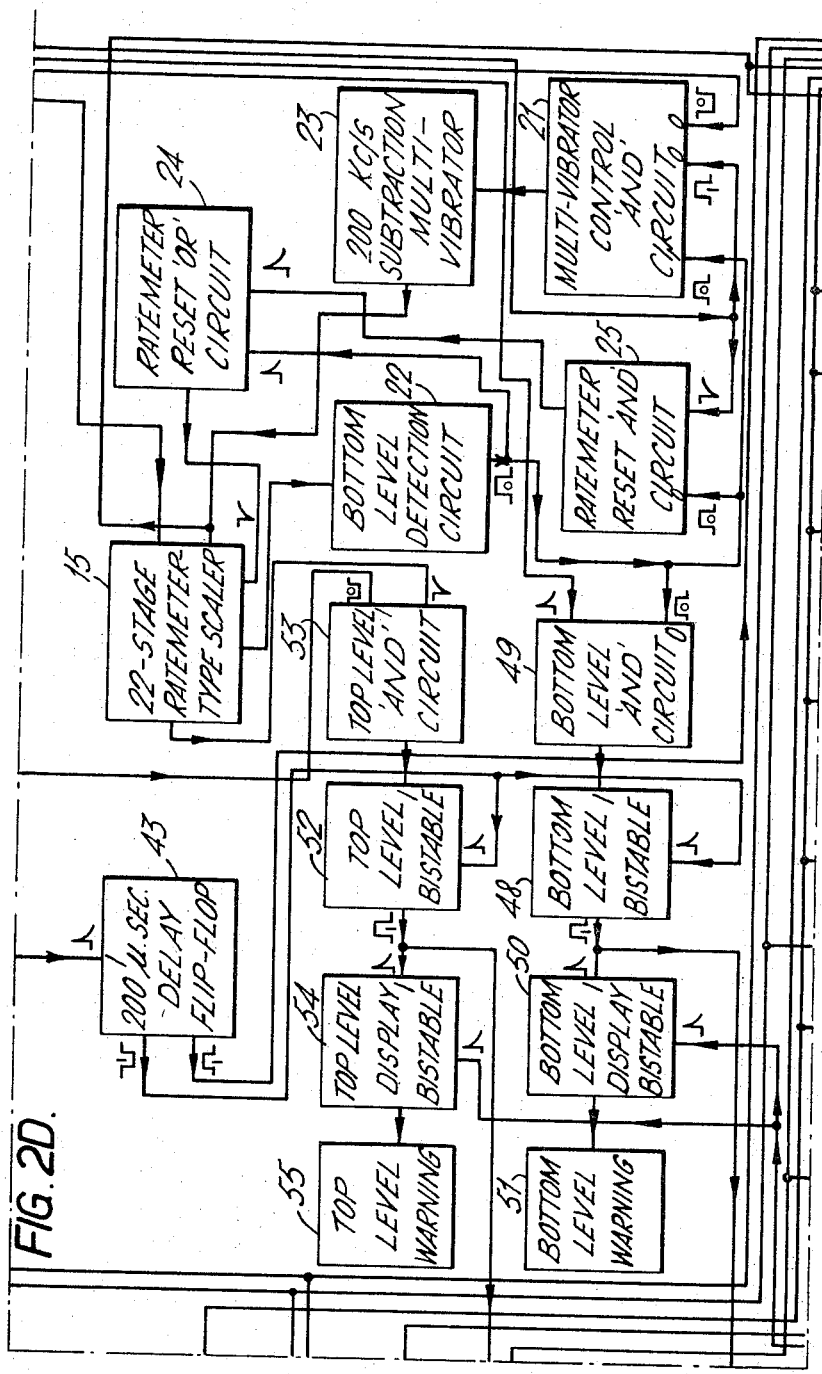

United States Patent Office 3,312,813
Patented Apr. 4, 1967

3,312,813
PERIOD METER AND LOGARITHMIC RATEMETER
Charles Holmes Vincent and John Brian Rowles, Basingstoke, England, assignors to United Kingdom Atomic Energy Authority, London, England
Filed June 24, 1964, Ser. No. 377,740
Claims priority, application Great Britain, June 28, 1963, 25,806/63
10 Claims. (Cl. 235—152)

This invention relates to period meters such as those used to measure the reactivity of a nuclear reactor, and also provides a logarithmic ratemeter.

The rate at which the neutron flux in a nuclear reactor is increasing or decreasing is usually specified in an inverse manner by the "period" or $e$-folding time, which is taken to be positive for an increase and negative for a decrease. The reciprocal of the period is an important quantity, being the fractional increase in the flux per second. It is this reciprocal, rather than the period itself, which is normally used in calculations on reactivity changes. In general, instruments for measuring periods fall into one or other of two classes. Those in the first class are for the guidance of reactor operators and for the operation of safety circuits. They give only approximate readings, but the answer is available immediately. Those in the second class are scalers or precise current integrators, used in either case with an accurate timing control. The latter can give very accurate measurements, but the results are not available until suitable calculations have been made on the readings. Whether the device used is a scaler or a current integrator, there is an ultimate statistical limit to the accuracy possible, depending on the number of neutrons actually detected in the times concerned. The present invention provides a new type of instrument which can give an immediate reading of the inverse period, at the end of each counting interval, with nearly the maximum accuracy statistically possible.

According to the present invention a period meter comprises digital scaler means for counting input pulses occurring in each of two successive time-intervals, means for repetitively subtracting from the number of pulses counted in each time-interval a fraction of the number remaining in said scaler means after each subtraction until that number has fallen to a predetermined value, and means for determining the difference between the number of subtractions required to reduce each of the counted numbers to said predetermined number, said difference being proportional to the reciprocal of the period of the source of input pulses.

Also according to the present invention a period meter comprises a digital scaler for counting input pulses occurring in each of at least one pair of successive time-intervals, means for repetitively subtracting, after the end of each time-interval, a fraction of the number remaining in said scaler after each subtraction until that number has fallen to a predetermined value, and at least one further scaler adapted to determine the difference between the number of subtractions required to reduce each of the numbers counted in the pair of successive time-intervals to said predetermined number, said difference being proportional to the reciprocal of the period of the source of input pulses.

Preferably two such further scalers are provided, arranged to determine alternatively the difference between the numbers of required subtractions in successive pairs of successive time-intervals.

Preferably the digital scaler is a binary scaler and the repetitive subtractions are performed by adding to the number in the scaler the 1's complement of the fraction.

Preferably the further scaler or scalers for determining the differences are decimal complementing scalers.

The present invention also provides a logarithmic ratemeter comprising digital scaler means for counting input pulses occurring in successive time-intervals, means for repetitively subtracting, from the number of pulses counted in each time-interval, a fraction of the number remaining in said scaler means after each subtraction until that number has fallen to a predetermined value, and means for determining the number of subtractions required to reduce each of the counted numbers to said predetermined value, said number of subtractions being proportional to the logarithm of the count-rate during said time-intervals.

To enable the nature of the present invention to be more readily understood, reference will be made in the subsequent description to the accompanying drawings, wherein:

FIGURE 1 is a block schematic circuit diagram of a decimal complementing scaler incorporated in the circuit of FIGURE 2.

FIGURES 2A–2F form, on assembly, a block schematic circuit of a period meter embodying the present invention.

Figure 3:
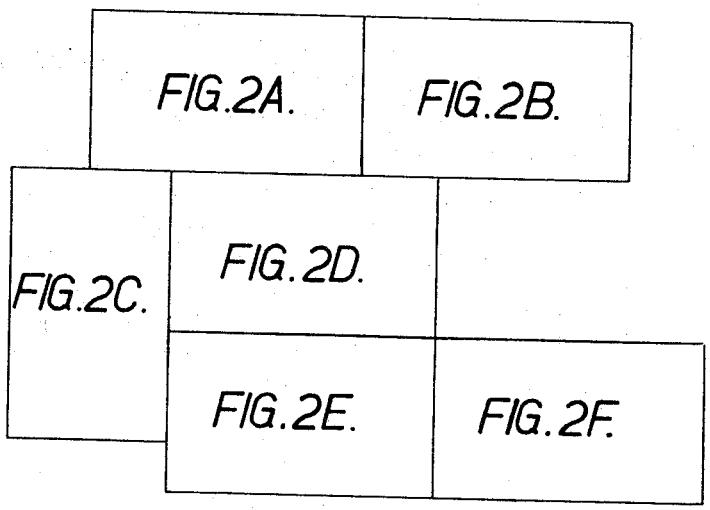

FIG. 3 is a block diagram showing the assembled layout of FIGS. 2A–2F.

For counting and subtracting the input pulses, the embodiment to be described employs a modification of the circuit of the digital linear ratemeter described in the specification of U.S. application Ser. No. 299,831, filed August 5, 1963, although the method of use is different. Basically, this embodiment comprises a fast binary scaler, which is used to count the incoming pulses for a fixed time-interval in the normal way, except that the pulses are fed into the third stage instead of the first, for reasons which will be explained. At the end of this interval, a small fixed binary fraction of the number recorded is subtracted from it, and this proportional subtraction process is repeated until a predetermined number is reached. The total number of subtractions required is therefore proportional to the logarithm (less a constant) of the original number present, to a very good approximation. This logarithm is recorded on a further complementing decimal scaler, which counts the subtractions. The logarithm is then complemented and the logarithm of the count in a second identical interval is added to the result, by counting the second sequence of subtractions into the same scaler, so that the first logarithm is effectively subtracted from the second. The common constant term is thereby cancelled.

The capacity of the complementing scaler is considerably greater than any number that can be counted into it in either part of this process. Therefore, there is an output pulse (carry) from this scaler if and only if the second count of subtractions is greater than the first one, that is, if the period is positive. This output pulse occurs during the second count into the complementing scaler and is recorded by means of a bistable circuit. If there is no output pulse and the bistable remains in the state to which it has been reset, the period is negative and the reading of the scaler is complemented again and displayed with a negative sign. If there is an output pulse, the reading is displayed without the second complementing, with a positive sign. The answer in either case is then proportional to the reciprocal of the period. There is a calibration factor depending on the interval (hereinafter termed the cycling time) between the starts of the two successive counting time-intervals, and the precise value of this cycling time can be chosen to make the calibration factor a convenient round number. Typical cycling times approximate to 1, 2, 4, 10 and 20 secs., and so on. The duration of each counting time-interval is slightly less than these cycling times, say by 0.1 sec., to allow time for the taking of the logarithm at the end of each time-interval. The exact duration of the counting time-interval does not matter, as long as it is the same for the two counts. By using two such complementing scalers alternately, it is possible to display the latest period measurement continuously while the next count proceeds, with the second time-interval of each pair serving as the first time-interval of the succeeding pair.

Statistical accuracy

Each period measurement made with the present invention depends only on the ratio of two counts. Calculations have been made to determine how the accuracy of such a measurement compares with the best possible accuracy obtainable from a measurement in which the same total counting time is divided into more than two intervals, with every point given its optimum weighting factor, as is done when using instruments of the aforementioned second class. It can be shown that the difference is very small, particularly when the time available to take a measurement is only about a period or less which is usually the case in the measurement of long periods. There is an optimum condition in which the ratio of the two counts in the two time-intervals is about 11.4:1, and the cycling time is then about 2.43 periods. However, the optimum condition is a very broad one, and good results are obtainable from about 1.4 to 4.2 periods, corresponding to count ratios from 4:1 to 64:1. In the present embodiment the steps provided in the cycling time control are sufficiently fine to permit a setting within the 1.4 to 4.2 range (1:3) mentioned, once the period has been calculated or measured approximately. The steps are 2:1 or 2.5:1, as given above.

As already mentioned, the logarithmic action on the present embodiment is obtained by the same subtraction circuit as in the ratemeter described in the aforementioned co-pending application. The latter circuit is essentially a fast binary scaler with $2n$ stages, where $n$ is, for example, 11. At each subtraction, the number in the scaler is divided by $2^n$ and the integral part of the quotient is then subtracted from that number. The action in the present case differs from that in the rate meter case, in that the subtractions are performed in a group at the end of each counting interval instead of continuously. The subtractions in each group continue until the number remaining in the scaler falls below $2 \times 2^n$.

For the rate meter application, this circuit permits spot readings to be taken with an expected value corresponding exactly to the mean counting rate. However, for the present application, the requirement is that the logarithm should be as accurate as possible and therefore that the exponential decrease should be as true as possible. For this reason, the rate meter circuit is slightly modified. In both applications of the circuit, the subtraction process is brought about by adding the 1's complement of the required reduction, and in the rate meter application this is completed, to give the 0's complement, by adding one more pulse into the scaler. In the period meter application, however, a binary circuit is inserted at this point, and the one is added only at every second subtraction. If the number in the scaler lies between $J \times 2^n$ and $(J+1) \times 2^n$, where J is an integer, the number subtracted is equally likely to be J or $J+1$ (so that on average it will be $J+½$) and these numbers are caused by the binary circuit to alternate. This gives a much more accurate exponential fall than is obtained by subtracting J only, as in the rate meter application.

The remaining error in the logarithm can be shown to be very small; with the input applied to the third stage and the subtractions stopped at $2 \times 2^n$ (i.e. when the total binary reading in all the stages divided by $2^n$ equals 2), and with $n=11$, the error in the logarithm is at all times less than 0.5 of a standard deviation of the statistical error, and is in most cases much less than this. There is an initial error which decreases rapidly as the number increases. For this reason, the stopping of the count at $2 \times 2^n$ instead of at $2^n$ is well worth while, even although it requires $n$ to be greater by one, for a given range of input counts, and therefore requires two extra stages preceding the input point. These two stages can be regarded as enabling the repeated subtractions of the fraction $2^n$ of the total number in the $2n$ stages to be performed to an accuracy of two additional binary digits beyond the number of input counts received by the scaler. This arrangement does not affect the necessary compromise between frequency of readings and statistical accuracy of readings, which must always be made, for a given count rate. It does, however, prevent any appreciable systematic error being added to the statistical error. The 22-stage scaler employed is exactly equivalent to a 20-stage scaler with the input to the first stage, from the statistical point of view, but it gives more accurate logarithms than the latter would. As in the rate meter application, the stages are divided into two groups, those recording the first (most significant) $n$ binary digits and those recording the last $n$. Each of the former controls the gate to one of the latter, during the subtraction. The subtraction of 1 part in $2^n$ from a number represents a decrease in the logarithm of $$-\log_e (1-½^n) \stackrel{\circ}{=} (½^n) + (½)(½^n)^2 \stackrel{\circ}{=} (1/(2^n-½))$$

This is $1/2047.5$ for $n=11$. (The number of subtractions corresponding to a factor of $e$ is therefore 2047.5.) If the subtractions required before the remaining count falls below $2^{n+1}$ are counted by a binary stage followed by a 4-stage decimal scaler, the reading in the latter is $(2047.5/2)\log_e (4C/2^{n+1})$, where C is the number of input pulses counted into the third stage of the rate meter type scaler and 4C is the corresponding reading therein. Since the maximum value of 4C is $2^{2n}-4$, the maximum value of $\log_e (4C/2^{n+1})$ is just under 0.69315 $(n-1)$, which is about 6.9 for $n=11$. For a cycling time of $1/1.02375$ sec the subtraction of the two decimal scaler readings as described gives the inverse period in seconds$^{-1}$ to three decimal places on the four decimal stages of the scaler, as the following calculation shows.

With a period P and two successive counts $C_1$ and $C_2$ made in equal counting-time intervals whose commencements are separated by a cycling-time T, the expected counts give, quite generally, $$C_2 = C_1 e^{T/P}$$

$$\therefore \left(\frac{4C_2}{2^{n+1}}\right) = \left(\frac{4C_1}{2^{n+1}}\right)e^{T/P}$$

$$P^{-1} = \frac{\log_e (4C_2/2^{n+1}) - \log_e (4C_1/2^{n+1})}{T}$$

$$= \frac{2}{2047.5T}(R_2 - R_1)$$

where $R_2$ and $R_1$ are the corresponding decimal scaler readings.

$$\therefore P^{-1} = \frac{(R_2 - R_1)}{1000}$$

The initial binary stage is only used to give the required factor of 2 (for $2 \times 1.02375 \times 1000 = 2047.5$) and to reduce rounding-off errors, and its reading is not displayed. The readings of the four decimal stages are displayed by means of numerical indicator tubes.

Complementing scaler action

Although reversible decimal scalers are available which add or subtract each input pulse according to the input line on which it appears; such scalers usually have a rather limited speed of operation. The complementary scalers used in the present embodiment to determine the differences between the numbers of subtractions are not reversible in the normal sense. However, quite generally, if the number in a scaler is complemented before a certain part of the count and is complemented again after that part, then that part of the count has effectively been subtracted.

The circuit used gives the 9's complement in the decimal stages and the 1's complement in the binary stages. This has the advantage that the complementing action in each stage is completely independent of that in any of the others. It would lead to an error of 1 in the last place for positive answers, where there is only one complementing action, but an extra single pulse is inserted into the complete scaler at each complementing, to give the correct 0's complement.

The principle of the complementing decimal stages is shown in FIG. 1. Each decade consists of four binary stages 101–104, with an additional forward connection 115 and a gate 106, which together convert the cycle to 10 instead of 16, in a well-known manner. Each binary stage is set to its 0 state when the scaler as a whole is reset to zero. The decimal digit recorded by the decade is given at any time in ordinary binary form by its four constituent stages. When the decade receives input pulses via connection 117, it counts these in the normal binary fashion up to 8, as the gate 106 is open, as are the three carry gates 107–109. The pulses passing forward from the "1" stage 101 to the "8" stage 104 do not have any effect on the latter while it is at 0. When the count of 8 is reached, the gate 106 is closed via connection 116 and prevents the passage of further pulses from the "1" 101 to the "2" stage 102. The count of 9 is then recorded in the normal manner. At the count of 10, the "1" stage 101 returns to 0 and gives a carry pulse, which cannot reach the "2" and "4" stages 102 and 103 through the gate 106, but which returns the "8" stage 104 to its 0 state, sending a carry pulse to the next decade via connection 118 and re-opening the gate 106. This leaves all the binary stages in their 0 states again and the decade is ready to recycle.

The complementing action is obtained by means of the six additional gate circuits 107–109 and 110–112, as follows. The gate line 105 is used to close the three carry gates 107–109 in the normal binary connections between the stages. This line is common to all the decades and its effect is to suppress any carry pulses during the complementing action. The digit in the "2" stage 102 never changes and therefore no such gate is required after this stage. The digit in the "1" stage 101 always changes, and this is effected by injecting a pulse from a line common to all the decades, pulse line 113. The digit in the "8" stage 104 must also be changed, if the digits in the "4" and "2" stages 103 and 102 are both 0, but not otherwise. Another common line, pulse line 114, provides an input pulse for this purpose, through the gates 110 and 111 controlled by these stages, at a time before the state of the "4" stage 103 has been altered. The digit in the latter stage must be altered if and only if there is a 1 in the "2" stage 102. The change is therefore effected by a pulse from pulse line 113 through the gate 112 controlled by the "2" stage 102. The operations required, in order, are therefore, closure of the carry gates 107–109, application of a pulse to line 114, application of a pulse to line 113, and reopening of the carry gates. This sequence gives the correct complement in all cases. The complementing binary stages required are identical with the "1" stages of the decades. Additional binary stages are provided for range selection, as hereafter explained.

In FIG. 2 corresponding units of, or related to, the two complementing scalers (hereafter designated scalers A and B) are distinguished by the addition of A or B to the reference numeral. Thus in FIG. 2 the complementing binary stages of these scalers are numbered 71A, 72A and 75A and 71B, 72B and 75B, and each of the four complementing decade stages 77A and 77B.

Cycling-time control

To cover the full range of periods likely to be encountered, by means of suitable cycling times, in sufficiently small steps to permit near-optimum measurements, intervals of approximately 1, 2, 4, 10, 20–2,000 and 4,000 secs. are provided. (More precisely, these intervals are all the corresponding multiples of 1/1.02375 sec=0.97680 sec. For example, the exact value of the longest interval is 3907.2 secs.) This range also enables the instrument to be used in its most sensitive condition to monitor the constancy of a wide range of counting rates (about 0.25 c./s. to $10^6$ c./s.), if this is required, or to measure at such counting rates periods which are so long that the experimenter is prepared to spend only a limited time, which is a fraction of a period, to obtain his answer. The time interval-control is achieved by means of two switches. One of these switches SW1A (FIG. 2) puts one or two extra binary stages 5, 6 into the timer dividing sequence, to give 1, 2 or 4 secs, as required. The other SW2A puts up to three decade stages 7, 8, 9 into the sequence, to give ×1, ×10, ×100 or ×1000. In the 2 sec. and 4 sec. positions of SW1A the corresponding number of extra complementing binary stages 71, 72 (with corresponding carry gates 73, 74) is also switched in series with the existing binary stage 75 at the input end of each of the two complementing scalers A and B, reducing their readings so that each still yields a correct inverse period. SW2A does not affect the four digits displayed at all, but is arranged to control via SW2C and SW2D an appropriately positioned decimal point (on neon tubes 68) and the zeros (on numerical indicator tubes 69) needed with it to give a correct total display of the reading. Whatever the cycling time the input gate 14 is closed for a precisely fixed interval of about 0.1 sec in each cycle, to allow time for the logarithm-forming and other operations between counts. The time for which the gate is closed does not matter, as long as it remains precisely the same from one cycle to the next and as long as it does not waste an unduly high proportion of the counting time in each cycle for the shortest cycles. It is possible to obtain readings which are inverse doubling times, instead of inverse periods, if this is required, by reducing the frequency of the crystal oscillator controlling the cycling times, by the factor 0.69315. The approximate cycling times available are then 1.4, 2.8, 5.6 and 14 secs., and so on.

Display control

It is clear that two false period readings would be obtained following any cycle in which the number of input pulses counted did not lie between $2^{10}$ and $2^{20}$. The ratemeter-type scaler sends out a carry pulse, if its capacity is exceeded, and in the present embodiment this pulse is recorded by means of a bistable circuit. Another circuit is used to provide a warning of a count of fewer than $2^{10}$ input pulses. Provision is made to inhibit the display of any period reading that would be faulty from either of these causes and to indicate the cause concerned. In normal operation, there is no display until the third cycle after the start, when the period reading is based on the counts in the first two cycles. The same applies after any change in the setting of the cycling time, which also requires a fresh start to be made.

Timing and control

The main timing control of the unit is provided by means of a 16.77312 kc./s. crystal-controlled oscillator 1 (see FIG. 2). This oscillator gives the necessary precision to the cycling time and the counting interval, and also controls the timing of most of the main operations in the sequence needed. A reset switch SW3 is provided. This switch operates the manual reset circuit 70 to reset all the bistables and scalers in the unit to their 0 states and must be pressed after the power has been switched on. Operation is initiated by means of the start button SW4, which changes the state of the timing gate bistable 2 from 0 to 1 and permits the timing oscillator pulses to pass through the gate 3. Operation is terminated by means of the reset switch SW3. The timing and control circuits have to perform a number of different functions, and it will be convenient to describe these functions one at a time, using the number of pulses from the timing oscillator 1 from the start of each cycle as a time reference to show their mutual relationship. It will be noted that, where the logical requirements permit it, the same timing circuit may be used for more than one purpose, in order to economise in timing circuits.

Conventions used in the description

To enable the explanation to be followed more easily, the following conventions are used in FIG. 2 and in the detailed description thereof which follows.

(1) The 0 state of all bistables and binaries is the state which is obtained by means of the reset switch.

(2) The 0 state of all flip-flops is the rest state.

(3) A rectangular waveform of correct sign is shown on each output line from such circuits.

(4) The state giving rise to this waveform is identified by a 0 or 1 within the rectangle.

(5) Wherever possible, this state is the state which is known to last for the lesser part of the whole cycle of operations.

(6) Where a circuit is operated by means of a pulse derived from such a waveform by differentiation, such a pulse is shown near the input to this circuit, with the correct sign to indicate its timing at the beginning or end of the waveform.

(7) Where a bistable or binary circuit is always set to 0 or always set to 1 by such an input pulse, the input connection is marked accordingly.

(8) Where an AND circuit, gate circuit or OR circuit receives a direct-current input depending upon the state from a line from a circuit having two states, a 0 or a 1 is marked near the input connection, to show which state of the *originating* circuit is required to give an output from the AND or OR circuit. (Note the difference between this and (7) above.)

Cycling time

The pulses from the timing oscillator gate 3 are fed into a 14-stage binary scaler 4 with a cycle of $2^{14}$. This scaler is followed by 0, 1 or 2 extra binary stages 5 and 6, as determined by the setting of the switch SW1A, and then by 0, 1, 2 or 3 decimal stages 7, 8 and 9, as determined by the setting of the switch SW2A. The duration of each cycle of the $2^{14}$ scaler alone is 16,384/16,773.12 sec.=1/1.02375 sec., as required. The switches SW1 and SW2 permit the multiples 1, 2, 4, 10, 20–4000 of this to be selected, as desired. The timing scaler comprising stages 4–9 initiates each new cycle by means of a pulse from the rotor of SW2A to the display reset bistable 10, which is thereby changed to its 1 state. This bistable is returned to its 0 state during the cycle and a new cycle can only start when the next pulse is received from SW2A.

Counting time-interval

The two timing detection circuits 11 and 12 produce output pulses at counts of 16 and 1536, respectively, on the $2^{14}$ scaler 4. The first pulse at 16 after starting has no effect, since the display reset bistable 10 is already in its 0 state. Further pulses at multiples of 16 do not have any effect either, for the same reason. At the count of 1536 after the start of each cycle, the input gate bistable 13 is changed to its 1 state by a pulse from the 1536 timing detection circuit 12 (1536=1024+512). This pulse opens the input gate 14 and admits the input pulses from the neutron detector circuit 78 to the third stage of the 22-stage ratemeter-type scaler 15, whose operation has already been described. Further pulses from the 1536 timing detection circuit 12 do not have any effect, as the input gate bistable 13 is already in its 1 state. The display reset bistable 10, having been set to its 1 state at the start of each new cycle, is reset to 0 at the count of 16 timing pulses. It then sends a pulse to the input gate bistable 13, resetting that to its 0 state, closing the gate and terminating the count of input pulses.

Scaler selection

The functions of the two complementing scalers alternate with each other, being interchanged at each new cycle. The scaler selection binary 16 is used to control this alternation. Its state is changed at the timing count of 16, when the input gate bistable 13 returns to its 0 state, in all cycles after the first after a new start.

Complementing scaler reset

The two complementing scalers are reset to zero alternately, one each cycle. This occurs at the beginning of the cycle when the display reset bistable 10 is set to its 1 state. This bistable then sends a pulse to each of the reset AND circuits 17 and 18. One or other of these, as determined by the state of the scaler selection binary 16, applies a suitable pulse to the reset line of the scaler which is to be reset.

Subtraction process

When the display reset bistable 10 is set to its 1 state at the timing count of 0, it triggers the subtraction delay flip-flop 20. This flip-flop introduces a delay of about 1900 μs. or 32 timing pulses, which enables the stages of the ratemeter-type scaler 15 to reach their final states after the input gate 14 closes at the timing count of 16 (requiring a few microseconds at most) with an ample safety factor of 2 to cover any changes in the delay time. When the input gate bistable 13 returns to its 0 state at the timing count of 16, it provides one of the three inputs required by the multi-vibrator control AND circuit 21. A second input to this AND circuit is provided by the bottom-level detection circuit 22, provided that the number of input pulses counted has reached $2^{10}$ or more, corresponding to a reading of $2^{12}$ or more on the scaler. The subtraction delay flip-flop 20 removes one of the inputs from the AND circuit 21 when it is triggered to its 1 state, but restores this when it returns to its rest state at about the timing count of 32. Assuming that the input pulse count is not less than $2^{10}$, subtractions then start and proceed at the rate of 200 kc./s., as determined by the 200 kc./s. multivibrator 23, which is released and triggered into operation. The subtractions are counted by both the complementing scalers. When the reading in the ratemeter-type scaler 15 falls below $2^{12}$, the bottom-level detection circuit 22 removes its input to the multivibrator control AND circuit 21. This action is so fast that no further subtractions occur. The maximum number of subtractions that can be required is about 14,000, taking about 0.07 sec., corresponding to about 1200 timing pulses. The subtractions must therefore be completed by about 1200 timing pulses after the start of each cycle. About 1536−32=1504 timing pulses are allowed for this, giving a good safety factor.

Ratemeter-type scaler reset

For convenience, and to reduce the number of timing tolerances which must be met, the resetting of the ratemeter-type scaler 15 is normally timed by means of the completion of the subtractions. The bottom-level detection circuit 22 sends a pulse to the ratemeter reset OR circuit 24 at this time. This pulse is passed on to the reset line of the scaler and resets it completely to zero. In any cycle where the number of input pulses does not reach $2^{10}$, so that there are no subtractions, the bottom-level detection circuit 22 provides an input to the ratemeter reset AND circuit 25. The pulse from the subtraction delay flip-flop 20 to this AND circuit, which is generated at this flip-flop returns to its rest state, is then transmitted to the ratemeter reset OR circuit 24, which passes it on to reset the scaler immediately.

Complementing action

This occurs at the timing count of 1536. As the input gate bistable 13 changes to its 1 state, it sends a pulse to the complementing gate flip-flop 26, which is triggered and remains in its 1 state for 25 µs. During this time, the complementing gate drive circuits 27 hold all the carry gates closed in both the complementing scalers A and B. The complementing delay flip-flop 30 produces a delay of 5 µs. from the start of this 25 µs. interval. This delay allows time for all the carry gates in the scalers (not shown in FIG. 2) to close. The complementing pulse flip-flops 31 and 32 are then triggered in turn, and each applies a voltage for 5 µs. to its corresponding *pair* of complementing pulse AND circuits 33, 34. The complementing action occurs in two steps, as already described. These steps occur when the output waveform from the respective flip-flops are first applied to the scaler stages, via the AND circuits 33 and 34, the former feeding pulse line 114 (FIG. 1) and the latter pulse line 113. At the end of the 25 µs. interval, when the complementing gate flip-flop 26 returns to its 0 state, the carry gates are opened again.

The AND circuits for one or other of the complementing scalers receive inputs from the scaler selection binary 16 for each cycle via the OR circuits 37–40, and that scaler, which is the one last reset, is therefore complemented for that cycle without qualification. An input to the AND circuits for the other scaler will be received, again via the OR circuits, from the sign discriminaiton bistable 41, 42 for that scaler, if and only if this bistable is in its 0 state. This bistable is reset to its 0 state at the same time as the scaler and only changes to its 1 state if it receives a carry pulse from the latter via gate 76 which is closed during the complementing action. Such a carry pulse is only produced if the period is positive, in which case it always occurs during the second count into the scaler. The number in this scaler is therefore complemented if and only if the period is negative.

The complementing action is completed in each case by counting a single pulse into the scaler in the normal way, after the carry gates have had time to reopen. This converts the 9's and 1's complement to a 0's complement, as already described, and is effected as follows. When the input gate bistable 13 changes to its 1 state at the timing count of 1536, it sends a pulse to the 200 µs. delay flip-flop 43, which is triggered to its 1 state. As it returns to its 0 state, this delay flip-flop sends pulses to the two scaler add 1 AND circuits 44, 45. These AND circuits are controlled via the corresponding OR circuits 46, 47 by the scaler selection binary 16 and the sign discrimination bistables 41, 42, so that the pulse reaches the scaler concerned if and only if it is being complemented.

Bottom-level circuits

The bottom-level bistable 48 is reset to its 0 state by a pulse from the 200 µs. delay flip-flop 43 sent 200 µs. after the timing count of 1536. When the 5 µs. subtraction delay flip-flop 20 returns to its rest state, at about the timing count of 32 in the next cycle, it sends a pulse to the bottom-level AND circuit 49. If the count of the input pulses has not reached $2^{10}$, as indicated by the voltage from the bottom-level detection circuit 22 to the AND circuit 49, this pulse is passed on to the bottom-level bistable 48, setting it into its 1 state. When the bottom-level bistable is set to its 1 state, it sends a pulse into the bottom-level display bistable 50, setting that into its 1 state also and showing a warning by means of a lamp 51 that the input count has been inadequate.

The resetting of bistable 50 to remove this warning is described below in the section on the display inhibit circuits.

Top level circuits

The top-level bistable 52 is reset to its 0 state by a pulse from the 200 µs. delay flip-flop 43 sent 200µs. after the timing count of 1536. This is at the same time as the bottom-level bistable 48 is reset. Although the ratemeter-type scaler 15 has then been counting input pulses for 200 µs., it could not possibly count more than 10,000 in this time (with a dead time of 20 µs.) and if it goes off-scale it must do so later than this. The top-level AND circuit 58 receives an input from the input gate bistable 13 from the timing count of 1536 in one cycle to the timing count of 16 in the next, that is, for the whole time that input pulses from the neutron detector are being counted. If there is a carry pulse during this count of input pulses, indicating that the ratemeter-type scaler 15 has gone off-scale, the AND circuit 53 passes it on to the top-level bistable 52, setting the latter to its 1 state and recording the fact of the excessive input. The closing of the AND circuit 53 at the timing count of 16 is sufficiently slow to allow through any very late carry pulse, which may be delayed slightly in the ratemeter-type scaler 15. On the other hand, the carry pulses which appear during the subtraction process are suppressed completely. There is, however, about 960 µs. available for the gate to close. When the top-level bistable 52 is set to its 1 state, it sends a pulse into the top-level display bistable 54, setting that into its 1 state also and showing a warning by means of a lamp 55 that the input count has been too great. The resetting of bistable 54 to remove this warning is described in the following section.

Display inhibit circuits

When either the top-level bistable 52 or the bottom-level bistable 48 goes to its 1 state, it provides a voltage to the inhibit display OR circuit 56, which passes it to the inhibit display AND circuit 57. When the input gate bistable 13 goes to its 1 state at the count of 1536, it sends a pulse to the inhibit display AND circuit 57. If the latter has an input from either of the level bistables, it passes this pulse on and resets both the inhibit display binary 58 and the inhibit display bistable 59 to the 0 state. The binary circuit 58 receives an input pulse changing its state at the timing count of 16 in each of the next two cycles and, provided that it is not reset again, it returns to its 0 state at the second pulse. In returning to its 0 state, it passes a pulse to the inhibit display bistable 59, setting the latter to its 1 state.

The 1 state of the inhibit display bistable 59 is the state which permits display. Hence, if an input count is either below the bottom level or above the top level, there is no display for the two cycles after that, during which the period shown would be incorrect. When the inhibit display bistable 59 returns to its 1 state, it sends out a pulse to both the top-level display bistable 54 and the bottom-level display bistable 50, resetting either to its 0 state, if it is in the 1 state. Since all the bistables and binaries concerned are set to the 0 state by the reset switch SW3 before each start, the start is automatically followed by two cycles with no display. When the cycling time is changed, the unit is automatically reset, as there is a reset position on each of the switches SW1D and SW2B between each pair of consecutive cycling-time positions.

Display control details

The control of the display from the appropriate complementing scaler is effected in a simpler manner by two sets of AND circuits 60. Each AND circuit has three inputs, one from a binary stage in one of the decades of the scaler concerned, one from the scaler selection binary 16, and one from the inhibit display bistable 59. The reading of the appropriate scaler A or B is therefore connected to the display decoders 61, provided that there is no top-level of bottom-level inhibition. The display decoders 61 convert the decimal digits from binary-coded to 10-wire form and apply voltage to the appropriate electrode of the numerical display tube 62 in each case. A similar arrangement of negative and positive AND circuits 63 and 64 is used to display the sign of the number in the appropriate scaler, taken from its sign discrimination bistables 41 or 42, provided that there is no inhibition. The sign is displayed on the sign display tube 67 via the negative and positive sign OR circuits 65 and 66. No provision is made to suppress the display at the time when the completing scalers are counting subtractions or awaiting complementing, as the times involved are so small that this does not matter.

*Table of operation times*

The times at which all operations occur in a normal cycle of the period meter are shown in the following table. The periodicity of the timing pulses from oscillator 1 is 1/16,773.12 sec.≑60 μS. The sequence shown for the complementing scalers A and B are interchanged for the next cycle, and so on. Where the operations concerned are conditional, the condition is described briefly in brackets after the operation. Note that in the first cycle of operations after starting, none of the operations shown in the table occur at all, until the count of 1536 timing pulses is reached, after which the sequence is in accordance with the table.

| Timing Pulses | μSec. | Operation |
|---|---|---|
| 0 | 0 | Display reset bistable 10 is set to 1. Scaler A is reset to zero. Subtraction delay flip-flop 20 is set to 1. |
| 16 | 0 | Display reset bistable 10 is set to 0. Input gate bistable 13 is set to 0. Count of input pulses is stopped. Scaler selection binary 16 changes state. Inhibit display binary 58 changes state. Inhibit display bistable 59 is set to 1 (if applicable). Display is restored (if applicable). |
| C.32 | | Subtraction delay flip-flop 20 returns to 0. Subtractions start (normal). Ratemeter scaler 15 is reset (bottom-level). Pulse to bottom-level AND circuit 49. Bottom-level bistable 48 is set to 1 (bottom-level). Bottom-level display bistable 50 is set to 1 (bottom-level). Bottom-level warning 51 is displayed (bottom-level). |
| C.1,200 (maximum) | | Subtractions are completed. Ratemeter scaler 15 is reset (normal). |
| 1,536 | 0 | Input gate bistable 13 is set to 1. Count of input pulses is started. 200 μs. flip-flop 43 is set to 1. 25 μs. flip-flop 26 is set to 1. 5 μs. complementing delay flip-flop 30 is set to 1. Carry gates in scalers A and B are closed. Pulse to inhibit display AND circuit 57. Inhibit display binary 58 is set to 0 (t. or b. level). Inhibit display bistable 59 is set to 0 (t. or b. level). Display is removed (t. or b. level). |
| 1,536 | 5 | 5 μs. complementing delay flip-flop 30 returns to 0. Complementing pulse 1 flip-flop 31 is set to 1. Scaler A, complementing pulse 1. Scaler B, complementing pulse 1 (negative). |
| 1,536 | 10 | Complementing pulse 1 flip-flop 31 returns to 0. Complementing pulse 2 flip-flop 32 is set to 1. Scaler A, complementing pulse 2. Scaler B, complementing pulse 2 (negative). |
| 1,536 | 15 | Complementing pulse 2 flip-flop 32 returns to 0. |
| 1,536 | 25 | 25 μs. flip-flop 26 returns to 0. Carry gates in scalers A and B start to reopen. |
| 1,536 | 200 | 200 μs. flip-flop 43 returns to 0. Scaler A, final complementing pulse Scaler B, final complementing pulse (negative). Bottom-level bistable 48 is set to 0. Top-level bistable 52 is set to 0. |
| Indefinite | | Top-level carry pulse (top-level). Top-level bistable 52 is set to 1 (top-level). Top-level display bistable 54, is set to 1 (top-level). Top-level warning 55 is displayed (top-level). |
| 16,384 (X integer) | | New cycle starts. |

In a modification of the described embodiment a switch is provided to allow the input pulses to be fed to the first stage of the ratemeter-type scaler 15 instead of to the third. This facility is advantageous at high pulse input rates and long cycling times because it enables higher input counts to be accommodated and hence greater accuracy to be attained. The consequent error in the logarithm is not serious for such high counts.

Similarly, although the number of stages is sufficient to accept most counts that can occur with the more probable cycling times selected and with the maximum likely input pulse rate, this may not always be so for the longest available cycling times. For this reason, in a further modification, a switch is provided by which the counting-time interval can be reduced without necessarily reducing the cycling time, the count being terminated in each cycle at a time dependent on the setting of the switch. The counting-time intervals selected by this switch are the same as the cycling times (less the short time required to take the logarithm in each case). If this switch is set to a higher counting-time interval than the cycling-time switch, the latter takes over its function. In operation the switch selects a pulse at the appropriate time in the cycle from the timer stages fed by oscillator 1, and feeds it to an input inhibit bistable (not shown in FIG. 2) which closes the input gate 14 for the remainder of the cycling time. The input inhibit bistable is reset by the input gate bistable 13 when the latter changes to its 1 state. The switch is so connected that the input inhibit bistable does not close the input gate 14 when the counting time-interval setting is greater than the cycling-time setting.

*Logarithmic ratemeter*

The method employed in the above-described period meter of obtaining logarithms of counts (or, strictly speaking, linear functions of such logarithms) can be used to provide an accurate logarithmic ratemeter. This is achieved by indicating successively, the number of repetitive subtractions required to reduce the number of pulses occurring in successive time-intervals to the predetermined value. (It will be recalled that in the period meter it is necessary to determine the *difference* between the numbers of subtractions required in successive *pairs* of time-intervals.)

Such a logarithmic ratemeter can be combined with the present digital period meter, for example, by making the following modifications to the circuit as described:

(a) Remove the present input to the complementing gate flip-flop 26, and take this input instead from a new long-delay flip-flop, triggered at the start of each input counting-interval by the input gate bistable 13. The duration of the quasi-stable state of this flip-flop is switched with the cycling time and adjusted in each case so that the flop occurs shortly before the end of the timing cycle.

(b) Apply this input also to a second (new) 200 μs. delay flip-flop (additional to 200 μs. delay flip-flop 43), which is connected to provide at a new time (near the end of the timing cycle) the add 1 pulses associated with the complementing.

(c) Apply the count on each complementing scaler in turn to a digital-to-analogue converter, using the new long-delay flip-flop to time this application for the duration of its own quasi-stable state only. Use the scaler selection binary 16 to switch to the converter in each cycle that complementing scaler which has received only one count, i.e. which records the number of subtractions relating to the first of each pair of successive counting time-intervals.

(d) Apply the output of the digital-to-analogue converter plus a fixed current (adjustable by a preset control) to a meter having an accurate logarithmic scale, this scale starting somewhat above the true meter zero. The fixed current is switched on and off with the converter current at all times.

(e) Use the inhibit display bistable 59 to operate a switch to cut off the digital-to-analogue converter output under the normal conditions for which the period display is inhibited.

It will be noted that each complementing scaler in the already-described digital period meter is in a resting condition from the time that it is complemented until the end of the timing cycle. There is therefore no objection to delaying the complementing, in the manner just indicated, until near the end of the timing cycle. This permits the logarithmic input rate to be displayed for a large part of each cycle, the exact fraction depending on how near to the end of the cycle the flop or the long-delay flip-flop can be set without danger of it passing the end of the cycle.

The introduction of the second (new) 200 μs. delay flip-flop permits the complementing action to be completed as before, but at the new time; the original 200 μs. delay flip-flop 43 was shared with other functions, which continue.

At any given time, for a large part of the cycle in the modified instrument, one complementing scaler contains one count only, while the other contains the difference of two counts. The former is that required for the logarithmic rate indication, and is readily selected by the correct connection to the two outputs of the scaler selection binary 16.

The arrangement of the digital-to-analogue converter and additional current source, as described, is such that the meter pointer will drop below the logarithmic scale when no current is applied to it, indicating that it is not in use. The converter output can easily be adjusted to the scale and sensitivity of the meter, if necessary, by adjusting its direct-current voltage input. The zero adjustment needed is provided by the preset control of the additional fixed current.

The inhibition of the logarithmic ratemeter display using the inhibit circuit 59 for the reciprocal period display, as described, is the simplest arrangement and suppresses all erroneous readings, plus a few others giving valid rates but not periods. For a logarithmic ratemeter only, a simpler circuit suppressing only erroneous logarithmic rates can readily be provided. It will be appreciated the logarithmic ratemeter need not be combined with a period meter, in which case the circuit can be considerably simplified, e.g. by excluding the circuits by which the differences between the numbers of subtractions in successive pairs of time-intervals are determined.

We claim:

1. A period meter comprising digital scaler means for counting input pulses occurring in each of two successive time-intervals, means for repetitively subtracting from the number of pulses counted in each time-interval a fraction of the number remaining in said scaler means after each subtraction until that number has fallen to a predetermined value, and means for determining the difference between the number of subtractions required to reduce each of the counted numbers to said predetermined number, said difference being proportional to the reciprocal of the period of the source of input pulses.

2. A period meter comprising a digital scaler for counting input pulses occurring in each of at least one pair of successive time-intervals, means for repetitively subtracting, after the end of each time-interval, a fraction of the number remaining in said scaler after each subtraction until that number has fallen to a predetermined value, and at least one further scaler adapted to determine the difference between the number of subtractions required to reduce each of the numbers counted in the pair of successive time-intervals to said predetermined number, said difference being proportional to the reciprocal of the period of the source of input pulses.

3. A period meter as claimed in claim 2, wherein two such further scalers are provided, arranged to determine alternately the difference between the numbers of required subtractions in successive time-intervals.

4. A period meter as claimed in claim 2, wherein the digital scaler is a binary scaler and the repetitive subtractions are performed by adding to the number in the scaler the 1's complement of the fraction.

5. A period meter as claimed in claim 3, wherein the further scalers for determining the differences are decimal complementing scalers.

6. A period meter comprising means for defining successive time-intervals, digital scaler means controlled by said time-interval defining means for counting the number of input pulses occurring in the successive time-intervals, means for repetitively, subtracting, after the end of each time-interval, a fraction of the number remaining in said digital scaler means after each subtraction until that number has fallen to a predetermined value, further scaler means for counting the number of subtractions required after each successive time-interval to reduce the number of input pulses counted in said time-interval to the predetermined value, said further scaler means being adapted to determine the difference between the numbers of subtractions required in successive pairs of time-intervals, and means for successively displaying said differences.

7. A period meter as claimed in claim 6, wherein said further scaler means comprises two further scalers connected to count simultaneously the numbers of subtractions in each time-interval, said scalers being arranged to determine alternately the difference between the numbers of required subtractions in successive pairs of successive time-intervals so that the second time-interval of each pair serves as the first time-interval of the succeeding pair.

8. A logarithmic ratemeter comprising digital scaler means for counting input pulses occurring in successive time-intervals, means for repetitively subtracting, from the number of pulses counted in each time-interval, a fraction of the number remaining in said scaler means after each subtraction until that number has fallen to a predetermined value, and means for determining the number of subtractions required to reduce each of the counted numbers to said predetermined value, said number of subtractions being proportional to the logarithm of the count-rate during said time-intervals.

9. A logarithmic rate meter comprising a digital scaler for counting input pulses occurring in successive time-intervals, means for repetitively subtracting, after the end of each time-interval, a fraction of the number remaining in said scaler after each subtraction until that number has fallen to a predetermined value, and at least one further scaler for determining the number of subtractions required to reduce each of the numbers counted in successive time-intervals to said predetermined number, said number of subtractions being proportional to the logarithm of the count-rate during said time-intervals.

10. A ratemeter as claimed in claim 9, wherein two such further scalers are provided, arranged to determine alternately the numbers of subtractions in successive time-intervals.

No references cited.

MALCOLM A. MORRISON, *Primary Examiner.*

M. J. SPIVAK, *Assistant Examiner.*